United States Patent [19]
Ahlenius et al.

[11] Patent Number: 5,859,839
[45] Date of Patent: Jan. 12, 1999

[54] METHOD FOR AUTOMATICALLY SELECTING CHANNEL POWERS IN A WIRELESS COMMUNICATION SYSTEM

[75] Inventors: Mark T. Ahlenius, Lombard; Gerald P. Labedz, Chicago; Robert T. Love, Barrington, all of Ill.

[73] Assignee: Motorola, Inc., Schaumburg, Ill.

[21] Appl. No.: 884,965

[22] Filed: Jun. 30, 1997

[51] Int. Cl.[6] .................................................. H04J 3/12
[52] U.S. Cl. .................... 370/252; 370/328; 370/522; 455/522; 455/424; 455/69
[58] Field of Search .................... 370/311, 318, 370/317, 328, 338, 310, 252, 522, 335, 342, 441, 479, 332; 375/296, 366, 348, 369; 455/423, 424, 425, 434, 422, 9, 10, 38.3, 501, 504, 505, 506, 522, 63, 65, 69, 70, 115, 132, 67.1, 67.4, 526

[56] References Cited

U.S. PATENT DOCUMENTS

| | | | |
|---|---|---|---|
| 4,639,914 | 1/1987 | Winters | 455/522 |
| 5,056,109 | 10/1991 | Gilhousen et al. | 455/522 |
| 5,241,690 | 8/1993 | Larsson | 455/69 |
| 5,386,588 | 1/1995 | Yasuda | 455/522 |
| 5,455,821 | 10/1995 | Schaeffer et al. | |
| 5,539,728 | 7/1996 | Gaiani et al. | 455/522 |
| 5,559,790 | 9/1996 | Yano et al. | 370/342 |
| 5,570,353 | 10/1996 | Keskitalo | 455/522 |
| 5,590,409 | 12/1996 | Sawahashi et al. | 455/69 |

OTHER PUBLICATIONS

S. Kirkpatrick et al., "Optimization by Simulated Annealing", Science, 13 May 1983, vol. 220, No. 4598, pp. 671–680.

Anton, Manuel Duque, Kunz, Dietmar and Ruber, Berhard, "Channel Assignment Using Simulated Annealing", pp. 121–128.

*Primary Examiner*—Huy D. Vu
*Attorney, Agent, or Firm*—Heather L. Creps

[57] ABSTRACT

The method operates in a wireless communication system serving a geographic area. The system includes first and second communication units within the geographic area which have first and second radio frequency (RF) channels associated therewith. The method includes defining a plurality of points within the geographic area; selecting an initial power of the first and second RF channels; identifying, at each of the plurality of points, a number of the first and second RF channels which are receivable; evaluating a system performance metric; adjusting the initial power of one of the first and second RF channels; based on the adjusted power re-identifying, at each of the plurality of points, a number of the first and second RF channels which are receivable; re-evaluating the system performance metric; based on the re-evaluation, accepting the adjusted power; and downloading the adjusted power to the wireless communication system.

18 Claims, 3 Drawing Sheets

METHOD FOR AUTOMATICALLY SELECTING CHANNEL POWERS IN A WIRELESS COMMUNICATION SYSTEM

FIELD OF THE INVENTION

This invention relates generally to wireless communication systems, and, more particularly, to a method for automatically selecting channel powers in a wireless communication system.

BACKGROUND OF THE INVENTION

In a typical wireless communication system such as a code division multiple access (CDMA) cellular radio frequency (RF) radiotelephone system, a communication unit such as a base station having a controller and a plurality of transmitters and receivers communicates with a switching center and with a mobile communication unit operating within an area served by the base station.

Designing a wireless communication system requires selecting geographic locations of base stations and their desired service areas, and ensuring that certain radio frequency channels, such as pilot, page and synch channels, are present within each service area, while interference with other service areas is minimized.

Typically, pilot-channel powers at each base station are manually adjusted, while page- and synch-channel powers are automatically scaled to the adjusted pilot-channel power levels. Traffic-channel power limits may also be automatically scaled to the pilot-channel power levels. For simplicity, pilot-, page- and synch-channel powers are referred to collectively herein as pilot-channel powers, although it is contemplated that the term pilot-channel power may apply to only one or any combination of such channels or to any similar type of channel. Although it is possible to select a specific pilot-channel power, prediction of the actual signal propagation pattern of the pilot-channel may be difficult where the signal may be reflected in unanticipated directions, resulting in insufficient signal strength in a base station's designated service area and/or unacceptable levels of interference in neighboring service areas. For example, setting one or more pilot-channel powers too high may cause too many pilot-channel signals to be present a various locations throughout the system, and may hinder a mobile communication unit's ability to select the best pilot-channel from a pathloss perspective, which may detrimentally affect soft handoff performance of the system. It may also cause the signal-to-noise ratio from all of the pilot-channel powers at a particular location to be unacceptable.

Moreover, it may be time consuming and expensive to manually select and field test different combinations of pilot-channel powers to obtain complete coverage and acceptable interference levels for each service area in the communication system.

There is therefore a need for a method for selecting channel powers in a wireless communication system which automatically evaluates the effects of setting an individual pilot-channel power on the entire wireless communication system, which results in a near optimum number of pilot-channels being available at critical points in the system, and which minimizes levels of interference within the system.

SUMMARY OF THE INVENTION

According to an aspect of the present invention, in a wireless communication system having a plurality of base stations within a geographic area, each of the plurality of base stations having a pilot-channel and a service area associated therewith, a method for selecting a power of each of the pilot-channels, the method including defining a plurality of points within the geographic area; setting a control parameter to an initial value; establishing an initial power of each of the pilot-channels; based on the established initial powers, determining, at each of the plurality of points, an interference level associated with each of the pilot-channels to form a first array; based on the selected initial powers, identifying, at each of the plurality of points, a number of pilot-channels which are receivable, to form a second array; evaluating a system performance metric, the system performance metric based on the first array and the second array; randomly selecting one of the pilot-channels; changing the power of the selected one pilot-channel; after the step of changing, updating the first and second arrays; based on the updated first and second arrays, re-evaluating the system performance metric; based on the re-evaluation, accepting or rejecting the changed power of the selected one pilot-channel, to form a preferred set of pilot-channel power values; repeating, a predetermined number of times, the step of randomly selecting through the step of accepting or rejecting; adjusting the control parameter; repeating, until the control parameter reaches a predetermined threshold, the step of randomly selecting through the step of adjusting; and downloading the preferred set of pilot-channel values to the wireless communication system.

According to another aspect of the present invention, in a wireless communication system serving a geographic area, the wireless communication system including a first communication unit within the geographic area, the first communication unit having a first radio frequency (RF) channel associated therewith, and a second communication unit within the geographic area, the second communication unit having a second RF channel associated therewith, a method for selecting a power of the first and second RF channels includes defining a plurality of points within the geographic area; selecting an initial power of the first and second RF channels; based on the selected initial powers of the first and second RF channels, identifying, at each of the plurality of points, a number of the first and second RF channels which are receivable; evaluating a system performance metric, the system performance metric based on the number of the first and second RF channels which are receivable; selecting one of the first RF channel and the second RF channel; adjusting the initial power of the selected RF channel to form an adjusted power of the selected RF channel; based on the adjusted power of the selected RF channel, re-identifying, at each of the plurality of points, a number of the first and second RF channels which are receivable; re-evaluating the system performance metric, the system performance metric based on the re-identified number of the first and second RF channels which are receivable; based on the re-evaluation of the system performance metric, accepting the adjusted power of the selected RF channel; and downloading the adjusted power of the selected RF channel to the wireless communication system.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 1:
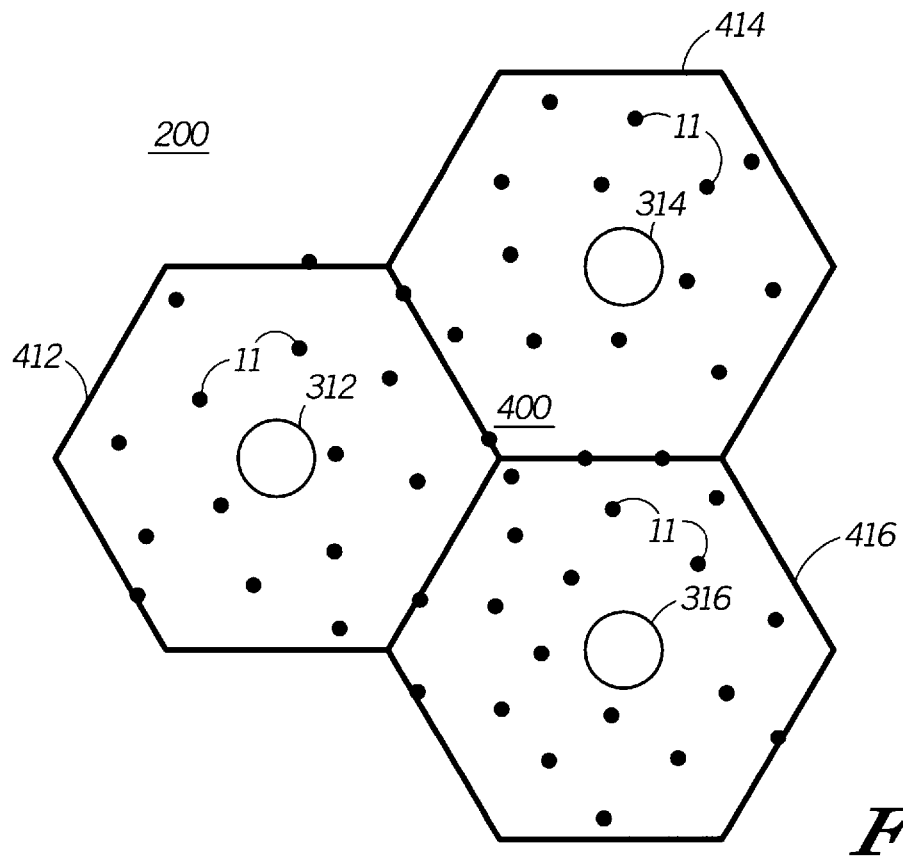
FIG. 1 is a diagram of a typical cellular communication system.

Turning now to the drawings, wherein like numerals designate like components, FIG. 1 is a diagram of a typical cellular communication system 200. A number of mobile communication units (not shown), or mobile stations, may operate in areas 412, 414 or 416 served by base stations 312, 314 and 316, respectively. Collectively, service areas 412, 414 and 416 cover a particular geographic area 400. A number of points 11 are shown within geographic area 400. Points 11 may be located anywhere within area 400, but are preferably located on public roads and within key buildings and other structures. Any number of points 11 may be identified within area 400, and it may be assumed that mobile stations operate at points 11. Neighboring service areas 412, 414 and 416 may be adjacent (as shown) or overlapping with respect to each other. It is contemplated that base stations 312, 314 and 316 may be sectors of a sectored base station (not shown), or may themselves be sectored base stations, but in general are devices capable of emitting radio signals throughout an area over which communication is to be established.

Multiple access wireless communication between base stations 312, 314 and 316 and mobile stations preferably occurs over radio frequency (RF) channels which provide physical paths over which communication signals such as voice, data and video are transmitted. Base-to-mobile station communications are said to occur on a forward-link channel, while mobile-to-base station communications are referred to as being on a reverse-link channel.

A communication system using code division multiple access (CDMA) channelization which is suitable for use with the various embodiments of the present invention is described in detail in TIA/EIA Interim Standard IS-95A, Mobile Station-Base Station Compatibility Standards for Dual-Mode Wideband Spread Spectrum Cellular Systems, Telecommunications Industry Association, Washington, D.C. July 1993 [IS-95A], and all addenda and revisions thereto, including but not limited to "TIA Telecommunications Systems Bulletin: Support for 14.4 kbps Data Rate and PCS Interaction for Wideband Spread Spectrum Cellular Systems", [the Bulletin], February 1996, and TIA/EIA Interim Standard IS-96 [IS-96]. IS-95A, the Bulletin and IS-96 are incorporated herein by reference. Another communication system using CDMA channelization is described in TIA/EIA Interim Standard IS-99, Data Services Option Standard for Wideband Spread Spectrum Digital Cellular System, Telecommunications Industry Association, Washington, D.C., also incorporated herein by reference.

Typically, mobile stations within a CDMA system transmit and receive communication signals over a common frequency spectrum, and specialized codes, such as Walsh codes, are used for separating multiple communication signals from one another in the system. Each specialized code typically represents one communication channel within the common frequency spectrum. A communication channel may be, among other things, a pilot channel, a paging channel, a synch channel, a traffic channel or part of a traffic channel.

Figure 2:
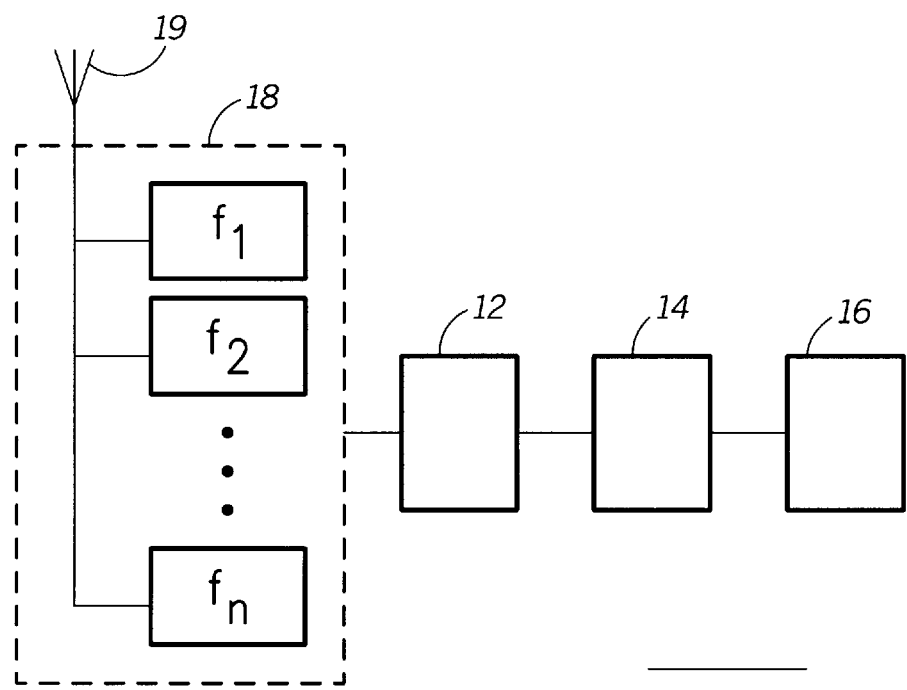
FIG. 2 is a block diagram of one of the base stations illustrated in FIG. 1, along with other typical network elements.

As shown in FIG. 2, a typical base station, such as base station 312, may include, among other things, a plurality of transceivers 18, which provide communication channels (f1 through fn, along with a code such as a Walsh code) for communication between mobile communication units and base stations 312, 314 and 316. F1 through fn preferably represent codes of a CDMA communication system, but may also refer to combinations of frequencies and codes. Wherever radio frequency channels are referred to herein, such channels are understood to refer to channels in a code-based radio-frequency communication system. Some communication channels, such as pilot-channels, may be dedicated to providing control and signaling information. Base station 312, which is commercially available from Motorola, Inc., may also include an antenna 19 which transmits and receives communication signals. Antenna 19 may be any type, for example, directional-beam, uni-beam, omni-beam, patch or array, and its transmit power and/or phasing may be controlled using various well-known techniques.

As shown, base station 312 is in communication with a Motorola base station controller 12, having a well-known structure and function. Additional base stations may also be coupled to base station controller 12. Base station controller 12 is in turn in communication with a switching center 14, which may be a mobile switching center such as an EMX™ 2500, commercially available from Motorola, or another suitable type of switching center. Additional base station controllers (not shown) may also be coupled to switching center 12. Switching center 14 may be in further communication with, among other things, a public switched telephone network (PSTN) 16, allowing mobile communication units to access land telephone lines and vice versa.

When planning a wireless communication system such as system 200 depicted in FIG. 1, the geographic locations of base stations 312, 314 and 316 and the approximate boundaries of coverage areas 412, 414 and 416 may be determined in various ways, for example, manually or by using well-known radio frequency propagation and planning tools such as Motorola's Netplan™ planning tool. Shapes and sizes of coverage areas 412, 414 and 416 may vary as a function of topology, availability of sites to place antennae and traffic congestion.

In addition, an initial set of radio frequency channel values, such as a pilot-channel power for each base station 312, 314 and 316 within system 200, may be input to a suitable radio frequency prediction and/or planning tool, and the tool may be used to calculate, for each pilot-channel power, an amount of pathloss (that is, an amount of attenuation) of the pilot-channel power which occurs from a given base station 312, 314 or 316 to a particular point 11 in geographic area 400. Pathloss calculations may be based on actual or measured data, or may be predictions based on well-known models.

To ensure accurate operation of system 200, however, it is important that a desirable number of pilot-channels are receivable by a mobile communication unit located at any point 11 within geographic area 400. For example, it is generally well-known that a near optimum number of receivable pilot-channels for locations throughout a CDMA system such as system 200 is between one and three. This is because currently available CDMA mobile stations are able to lock onto three pilot-channels simultaneously. Additional pilot-channels may interfere with the three best pilot-channels, effectively decreasing coverage at points where more than three pilot-channels are receivable. Of course, future generations of mobile stations may have capacities to lock onto a fewer or a greater number of pilot-channels.

Figure 3:
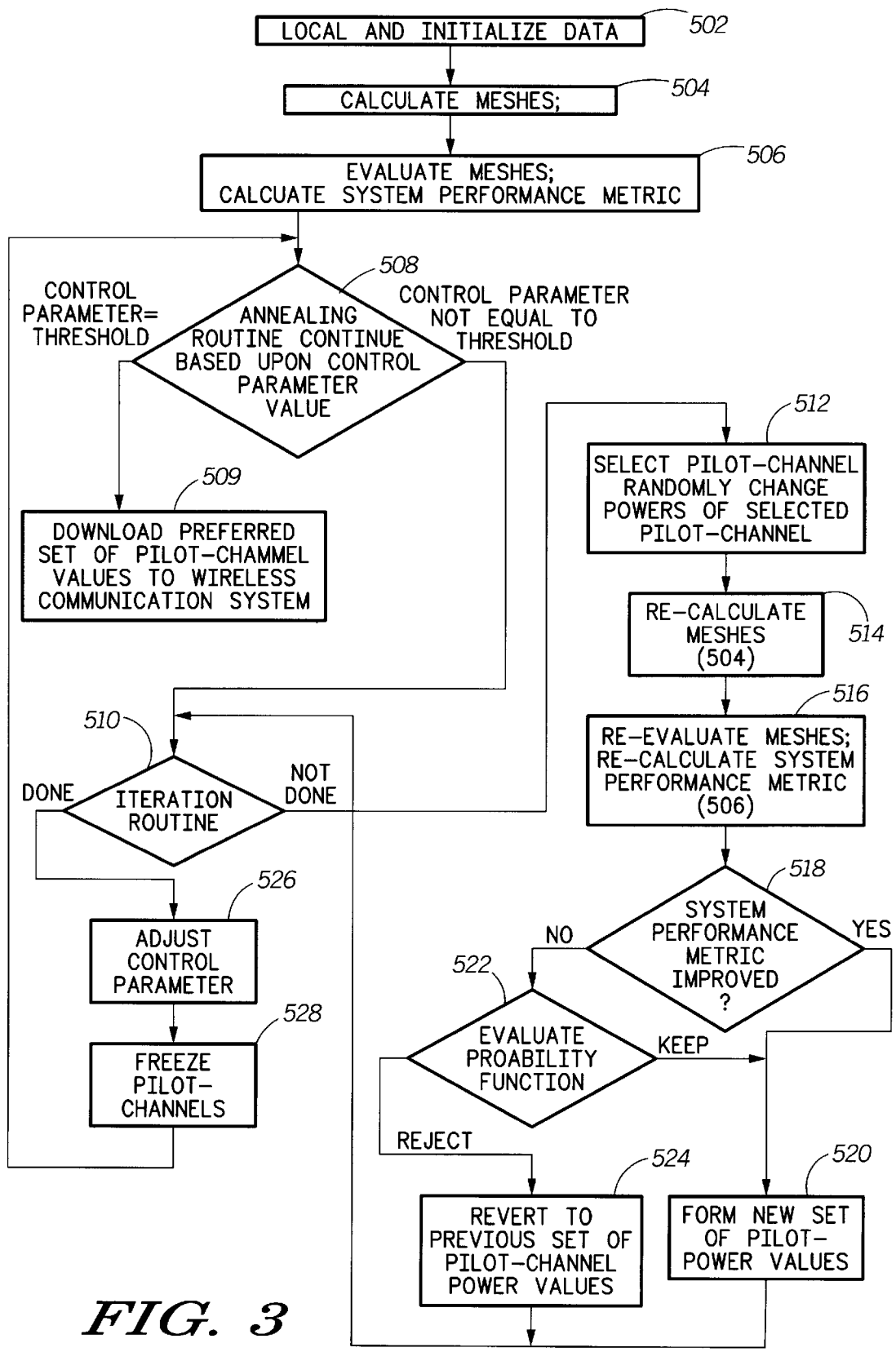
FIG. 3 is a flowchart of a method for automatically selecting a power of one or more of the base station channels illustrated in FIG. 2, according to a preferred embodiment of the present invention.

According to one aspect of the present invention, a method, a flowchart of which is illustrated in FIG. 3 (and further described with reference to FIGS. 1 and 2 as necessary), provides for automatically selecting pilot-channel powers so that, among other things, a desirable number of pilot-channels are receivable by mobile stations located at points 11. The method may be implemented in software, written in any well-known computer-readable language such as C/C++ and performed on a high-performance workstation with one or more microprocessors using serial or parallel processing techniques. For example, an Origin™ 2000 computer system or a Hewlett Packard Convex™ system may be used.

At block 502, the step of loading and initializing data is performed, which may include, among other things, determining geographic locations of base stations 312, 314 and 316, the approximate coverage areas 412, 414 and 416 based on different attenuation levels, and an initial set of pilot-channel power values associated with base stations 312, 314 and 316, as discussed above. In addition, a number of points 11, or mobile stations, active in system 200 may be selected, and a traffic congestion model may be established. The model may be based upon actual measurements of active traffic in the system at a given time, or alternatively upon predicted data.

Next, at block 504, a number of meshes are calculated. A mesh is a two-dimensional array of data. A first mesh, referred to herein as an interference array, includes, for each point 11 in geographic area 400, an interference level, such as an $E_c/I_o$ ratio, which is a ratio of an average energy per PN chip for a particular channel to the total received power spectral density at a mobile station's antenna connector. The interference level at each point 11 is computed as if a non-interfering mobile station were placed at each point 11. For example, for a point 11 within service area 412 associated with base station 312, the interference level is calculated where $E_c$ is the average energy per PN chip of the pilot-channel associated with base station 312, and $I_o$ is the total received power spectral density, including signal and interference, with respect to a mobile station antenna connector located at point 11. For example, typical interference level values range from zero through –19. A preferred interference level is within the range –1 through –12, although other ranges are possible.

A second mesh, referred to herein as a handoff array, identifies, based on pathloss data and other interference data, for each point 11 in geographic area 400, a number of the pilot-channels from base stations 312, 314 and 316 which are receivable at each point 11. This may be accomplished by determining the number of pilot-channels having interference level values above a predetermined threshold. The number of receivable pilot-channels may vary from zero through 12 or more. A preferred number of receivable pilot-channels is between one and three, although other ranges are possible.

It may also be desirable to calculate a minimum pathloss value between a given base station 312, 314 or 316 and any point 11 within the base station's respective service area 412, 414 or 416. Then, for each of the number of pilot-channels which are receivable at each point 11 within a particular service area, to track the pathloss for any pilot-channel which is more than a predetermined number of decibels, for example, six decibels, from the minimum pathloss value. If the pathloss is more than the predetermined number of decibels, the pathloss which is outside of such a window is recorded, to form a difference value (discussed further below).

A third array, referred to herein as a forward power array, is based on the established traffic congestion model. For each base station 312, 314 and 316, based on the pilot-channel powers and the distance of each point 11 from a particular base station 312, 314 and 316, points 11 are assigned to particular service areas 412, 414 and 416, as appropriate, according to well-known methods. Then, for each point 11 within a particular service area 412, 414 or 416, the array includes an estimate of a power level at each point 11 within that service area. The power level may be a forward power level, represented by static powers within the service area, such as the pilot-channel power associated with the base station serving the service area, as well as by dynamic powers within the service area, such as the forward traffic channel power associated with the base station serving the service area.

Alternatively, the third array may not be calculated. Instead, the number of points 11 within geographic area 400 may be normalized to each service area 412, 414 or 416 by dividing the number of points within area 400 by the number of service areas, to produce a number of points per service area. Then, a forward power level for each service area may be multiplied by the number of points per service area.

Figure 4:
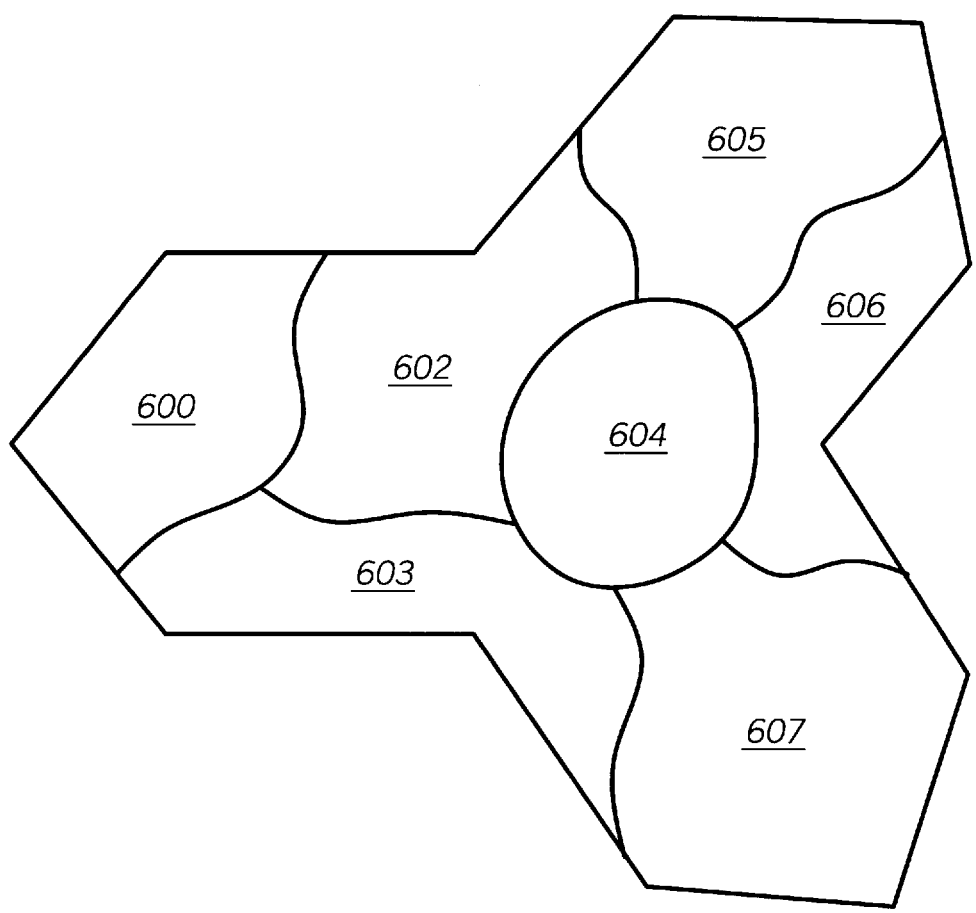
FIG. 4 illustrates areas of different levels of importance within the system shown in FIG. 1.

A fourth mesh, referred to herein as an importance array, identifies, for a particular point 11, a level of importance of the location of the point 11. As shown in FIG. 4, some sections of geographic area 400 may be more important than others—for example, sections 600 through 607 may have one or more different levels of importance. It is contemplated that, among other things, traffic density or demographics may determine a level of importance of a particular section 600 through 607. It is also contemplated that sections may be defined by numbers in reverse-chronological order, from most important-to-least important, for example, from three-to-zero.

Other meshes are also possible. For example, a mesh which indicates an amount of power required by imaginary mobile stations located at various points 11 within geographic area 400 to contact various base stations 312, 314 and 316 within system 200 may be calculated.

Referring again to FIG. 3, at block 506, the interference array, the handoff array, the forward power array and the importance array are evaluated. Values, or mesh bins, associated with points 11 in the interference array, the handoff array and the forward power array may be sorted in various ways. One example of a suitable way to sort mesh bins in the arrays is to, for each array, group mesh bins having the same values together. Thus, in the interference array, mesh bins having interference level values of –1 may be grouped together, mesh bins having interference level values of –2 may be grouped together, and so on. In the handoff array, mesh bins where the number of receivable pilot-channels was one would be grouped together, mesh bins where the number of receivable pilot-channels was two would be grouped together, and so on. In the forward power array, array values having power levels of 15–20 Watts may be grouped together, array values having power levels of 20–25 Watts may be grouped together, and so on.

It may also be desirable to further sort mesh bins in the interference, handoff and forward power arrays according to levels of importance as defined by the importance mesh. For example, with respect to the interference array, mesh bins within the group of mesh bins having interference level values of −1 and importance levels of 1 may be placed in one sub-group, while mesh bins having the same interference level value (−1) but having importance levels of two may be placed in a second sub-group, and so on. An analogous process would be followed for the handoff array.

After sorting the interference, handoff and forward power arrays into groups as desired, a number of mesh bins in each group may be determined, and the resulting numbers may be multiplied, or scaled, by predetermined penalty values to form partial penalties. Penalty values may be based on the mesh bin values, and located in lookup tables. For example, in the interference array, mesh bins, or a group of mesh bins, having interference levels of zero through −11 may be scaled by a penalty value of zero, that is, no penalty would be assigned to these interference levels. Mesh bins having values of −12, −13, −14, −15, −16, −17, −18 and −19 may be scaled by penalty values of 0.1, 0.2, 0.3, 0.5, 0.9, 1.0, 1.1 and 1.5, respectively, to form partial penalties.

In another example, in the handoff array, mesh bins, or a group of mesh bins, having values of 0 and 1 may be scaled by penalty values of 0.2 and 0.08, respectively, to form partial penalties, mesh bins having values of 2 or 3 may be scaled by a zero-value penalty to form still other partial penalties, and mesh bins having values of 4, 5, 6, 7, 8, 9 and 10 may be scaled by penalty values of 0.4, 0.5, 0.6, 0.8, 1.0, 1.2 and 1.4, respectively, to form further partial penalties.

In still another example, in the forward power array, array locations, or a group of array locations, having power values greater than or equal to 15 Watts may be penalized according to the following pattern: for array locations having values 0, 1, 2, 3, 4, 5, 6, 7, 8, 9 and 10 Watts above 15 Watts, such array locations may be scaled by penalty values of 0.02, 0.04, 0.06, 0.08, 0.1, 0.12, 0.14, 0.16, 0.18, 0.2 and 0.22, respectively, to form partial penalties. In addition, penalty values such as the aforementioned values may be assigned to specific ranges of forward power values. Ranges may be 3-Watt ranges or 5-Watt ranges, for example. Forward power penalties may also be normalized based on the calculated number of array points per service area.

In addition, if groups of mesh bin values have been sorted into sub-groups according to importance levels, certain groups of mesh bins may be more heavily penalized if they are in more important sections of system 200. Conversely, lower penalties may be assigned if particular groups of mesh bins are in less important sections. For example, importance levels of 0, 1, 2 and 3 may be associated with penalty values such as 0.0, 0.25, 0.75 and 1.0, respectively. Such a result may also be accomplished during the calculation of the interference and handoff arrays by scaling each mesh bin in each array by a level of importance as defined by the importance mesh.

It may also be desirable to discourage, through the use of penalty values, geographical clusters of pilot-channels which are not associated with the same base stations. That is, for a particular group of points 11 in a particular region within geographic area 400, the pilot-channels would ideally be the same for as many points 11 as possible. One approach would be to perform a "nearest neighbor" analysis. That is, if pilot-channels receivable at points a certain distance away from particular service area do not originate from certain base stations or sectors of certain base stations, then a penalty may be assigned to such points.

Penalties may also be assigned to any handoff mesh bin value which has a pathloss for any pilot-channel which is more than a predetermined number of decibels above the minimum pathloss value (discussed above). This value, referred to as a difference value, may be summed for each mesh location. One suitable method of computing a penalty would be to multiply the difference value by a floating point penalty value, such as 0.001, and to take the square root of the result.

Total penalty values for each of the interference, handoff and forward power arrays may be determined by adding the partial penalties associated with each array. A system performance metric may be obtained by adding the total penalty values of the interference, handoff and forward power arrays.

Next, at diamond 508, a routine which automatically selects near-optimal pilot-channel powers for each base station 312, 314 and 316 within system 200 is entered. The routine is based on a computer science optimization technique called simulated annealing, although other tools such as genetic algorithms or evolutionary programming may be used. According to the simulated annealing technique, a control parameter is used to model the temperature of an oven used in metallurgical annealing. The control parameter, or temperature, is set to an initial value, such as 30, and is lowered over time, according to a predetermined schedule (discussed further below).

A detailed description of the simulated annealing process is provided in U.S. Pat. No. 5,455,821 to Schaeffer et al., incorporated by reference herein.

At diamond 510, an iteration routine begins. The iteration routine is performed a predetermined number of times at each temperature value, preferably at least one-hundred times the number of sectors within system 200.

At box 512, one of the pilot-channels associated with base stations 312, 314 or 316 is randomly selected, and the power of the selected pilot-channel is changed. The selected pilot-channel is preferably one that is not frozen (discussed further below). Each individual pilot-channel power may have unique minimum or maximum power values, to allow for different types of base stations which may have particular power limitations. Suitable minimum and maximum pilot-channel power values are one and seven Watts, respectively.

According to one method of changing the selected pilot-channel power, a random number generated by a normalized random number generator, the construction and operation of such number generators being well-known, is added or subtracted from the selected pilot-channel power. The random number generator may have a zero-mean value, or a positive- or negative-mean value. Preferably, the selected pilot-channel power is changed by at least one decibel. When the temperature is high, however, relatively larger pilot-channel power changes may be allowed, for example, three decibels, and when the temperature is lower, smaller pilot-channel power changes, such as one decibel, may be performed. This is made possible by starting off with a standard deviation of 1.5, for example, and over time reducing the standard deviation value to, for example, 0.5.

The interference, handoff, forward power and importance meshes and the powers and service area ownerships of mobile stations are re-calculated at block 514, which entails performing the steps described in connection with block 504. At block 516, the meshes are re-evaluated, and the system performance metric is re-calculated, in accordance with the steps described in connection with block 506.

At diamond 518, the system performance metric based on the changed pilot-channel power is compared to the previous system performance metric. If the pilot-channel power change improved the system performance metric, the power change performed at block 512 is accepted, and a new set of pilot-channel powers is formed at block 520, reflecting the change in the power of the pilot-channel selected at block 512.

If the pilot-channel power change did not improve the system performance metric, a probability function is evaluated at block 522, to determine whether to accept the pilot-channel power change performed at block 512. The probability function may be based on the current control parameter value—the higher the control parameter value, the more likely the pilot-channel power change will be accepted. This is to draw the system out of local minima in search of lower global minima. A suitable probability function is $F=\exp^{(-metric\ difference/T)}$, where the metric difference is the difference between the previous system performance metric and system performance metric based on the changed pilot-channel power and T is the value of the control parameter. If F is greater than a pseudo-random number, then the pilot-channel power change is accepted. If F is less than or equal to the pseudo-random number, the change is rejected. Thus, as the temperature declines, the number of changes in pilot-channel powers not resulting in improved system performance per iteration will be reduced.

If, after evaluation of the probability function at block 522, the pilot-channel power change is rejected, the previous set of pilot-channel powers, the set which does not reflect the change performed at block 512, is reestablished at block 524.

The routine returns to block 510, where, if the predetermined number of iterations have not been completed at a particular control parameter value, the process repeats from block 512. If the predetermined number of iterations have been completed, the control parameter, or temperature, is adjusted at block 526. The temperature is preferably adjusted from its current value by multiplying the temperature by a predetermined temperature scale multiplier. In the preferred embodiment the initial temperature is 30 and the first temperature scale multiplier is 0.8. The second and third temperature scale multipliers are 0.9 and 0.1, respectively. In addition, after a user-defined number of iterations, it may be desirable to re-position imaginary mobile stations at various points 11 within geographic area 400, so that pilot-channel powers may be calculated for a variety of traffic densities.

At block 528, after each temperature adjustment, pilot-channels which have been selected and changed, but whose changes have not been accepted after predetermined number of attempts, may be frozen. A frozen pilot-channel is no longer changeable. Freezing pilot-channels may decrease the time it takes to arrive at a near-optimal set of pilot-channel powers.

The routine returns to block 508. If the control parameter has not reached a predetermined value, for example, a value at which less than a predetermined number of pilot-channel changes have been accepted over a predetermined number of iterations, the routine continues at diamond 510. If the control parameter has reached the predetermined value, which may be 0.00001 in one case, the routine ends and the current set of pilot-channel power values are downloaded to wireless communication system 200. The pilot-channel powers may be downloaded to MSC 14, BSC 12 or to any other suitable network element.

In this manner, it is possible to reiteratively and automatically select pilot-channel powers in the wireless communication system 200. Combinations of pilot-channel powers which most fully cover service areas 412, 414 and 416 with the least propagation into neighboring service areas and which nearly optimize a number of pilot-channels receivable at any given point 11 within geographic area 400 may be downloaded directly to system 200 or may be stored in a memory for future use.

CDMA cellular communication systems have been referred to herein, but the present invention is applicable to any spread spectrum communication system, as well as to other types of communication systems such as personal communication systems, trunked systems, satellite communication systems and data networks. Likewise, the principles of the present invention which apply to radio frequency spread spectrum pilot-channels also apply to all other types of radio frequency channels and to other types of wireless communication channels, such as satellite links.

It will be understood that a communication system, and network elements therein, in which the aspects of the present invention may be used, may be configured in any suitable manner, and that the various embodiments of the present invention are equally applicable to initially setting pilot-channel powers as to tuning, or resetting, pilot-channel powers within an existing system. In addition, various aspects of the embodiments of the present invention may be modified. For example, other and different penalty values may be utilized as desired. In another example, instead of increasing or decreasing the selected pilot-channel power, it is contemplated that the selected pilot-channel power may be swapped with another pilot-channel power within system 200.

It will be apparent that other and further forms of the invention may be devised without departing from the spirit and scope of the appended claims and their equivalents. It will also be understood that this invention is not to be limited in any manner to the specific embodiments described above, but will only be governed by the following claims and their equivalents.

We claim:

1. In a wireless communication system having a plurality of base stations within a geographic area, each of the plurality of base stations having a pilot-channel and a service area associated therewith, a method for automatically selecting a power of each of the pilot-channels, the method comprising the steps of:

defining a plurality of points within the geographic area;

setting a control parameter to an initial value;

establishing an initial power of each of the pilot-channels;

based on the established initial powers, determining, at each of the plurality of points, an interference level associated with each of the pilot-channels to form a first array;

based on the selected initial powers, identifying, at each of the plurality of points, a number of the pilot-channels which are receivable, to form a second array;

evaluating a system performance metric, the system performance metric based on the first array and the second array;

randomly selecting one of the pilot-channels;

changing the power of the selected one pilot-channel;

after the step of changing, updating the first and second arrays;

based on the updated first and second arrays, re-evaluating the system performance metric;

based on the re-evaluation, accepting or rejecting the changed power of the selected one pilot-channel, to form a preferred set of pilot-channel power values;

repeating, a predetermined number of times, the step of randomly selecting through the step of accepting or rejecting;

adjusting the control parameter;

repeating, until the control parameter reaches a predetermined threshold, the step of randomly selecting through the step of adjusting; and downloading the preferred set of pilot-channel values to the wireless communication system.

2. The method according to claim 1, wherein the wireless communication system comprises a code division multiple access (CDMA) system.

3. The method according to claim 1, wherein each of the plurality of points is located proximate a road.

4. The method according to claim 1, wherein the step of changing the power of the selected one pilot-channel comprises changing the power by an amount selected by a normalized random number generator.

5. The method according to claim 4, wherein the amount is at least one decibel.

6. The method according to claim 4, wherein the amount is a function of the control parameter.

7. The method according to claim 1, further comprising the step of:

based on the changed power of the selected one pilot-channel, dividing the plurality of points among the service areas.

8. The method according to claim 7, further comprising the steps of:

for each service area, at each of the plurality of points within each service area, estimating a power level;

at each of the plurality of points within each service area, assigning one of a plurality of predetermined weighting values to the power level to form a power penalty value;

summing the power penalty values over all of the plurality of points within each service area to form a service-area power penalty value; and summing the power penalty values of each service area to form a total power penalty value.

9. The method according to claim 8, wherein the power level at one point in one service area associated with one base station comprises:

a power of the pilot-channel associated with the one base station and a forward traffic channel power associated with the one base station.

10. The method according to claim 8, wherein the interference level at one point in one service area associated with one base station comprises:

a ratio of a power of the pilot-channel associated with the one base station to a the powers of the remainder of the plurality of pilot-channels.

11. The method according to claim 8, further comprising the steps of:

at each of the plurality of points, assigning one of a plurality of predetermined weighting values to the interference level, to form an interference penalty value;

summing the interference penalty values over all of the plurality of points to form a total interference penalty value;

at each of the plurality of points, assigning one of the plurality of predetermined penalty values to the number of the pilot-channels which are receivable, to form a handoff penalty value; and summing the handoff penalty values over all of the plurality of points to form a total handoff penalty value.

12. The method according to claim 11, further comprising the steps of:

after the step of defining the plurality of points within the geographic area, defining a plurality of sections within the geographic area; and assigning a priority value to each of the plurality of sections.

13. The method according to claim 12 wherein the priority level is based on one of traffic density and geographic location.

14. The method according to claim 12, wherein the step of re-evaluating the system metric is based on the priority values, the total interference penalty value, the total handoff penalty value and the total power penalty value.

15. The method according to claim 1, wherein the step of either accepting or rejecting is based on a value of the control parameter.

16. The method according to claim 1, further comprising the step of:

measuring an acceptance rate of the changed power of the selected one pilot-channel.

17. The method according to claim 16, further comprising the step of:

prohibiting the changing of the power of the selected one pilot-channel when the acceptance rate is below a predetermined threshold, to form a frozen pilot-channel.

18. The method according to claim 17, wherein the step of randomly selecting one of the pilot-channels comprises selecting a non-frozen pilot-channel.

* * * * *